US012126737B2

(12) United States Patent
Li et al.

(10) Patent No.: US 12,126,737 B2
(45) Date of Patent: Oct. 22, 2024

(54) METHOD FOR DOWNLOADING KEY, CLIENT, PASSWORD DEVICE, AND TERMINAL DEVICE

(71) Applicant: PAX COMPUTER TECHNOLOGY (SHENZHEN) CO., LTD., Guangdong (CN)

(72) Inventors: Lijun Li, Shenzhen (CN); Rongshou Peng, Shenzhen (CN)

(73) Assignee: PAX COMPUTER TECHNOLOGY (SHENZHEN) CO., LTD., Shenzhen (CN)

(*) Notice: Subject to any disclaimer, the term of this patent is extended or adjusted under 35 U.S.C. 154(b) by 273 days.

(21) Appl. No.: 17/770,131

(22) PCT Filed: Oct. 8, 2019

(86) PCT No.: PCT/CN2019/109896
§ 371 (c)(1),
(2) Date: Apr. 19, 2022

(87) PCT Pub. No.: WO2020/078225
PCT Pub. Date: Apr. 23, 2020

(65) Prior Publication Data
US 2023/0353389 A1    Nov. 2, 2023

(30) Foreign Application Priority Data
Oct. 15, 2018    (CN) .......................... 201811195466.6

(51) Int. Cl.
*H04L 9/32*    (2006.01)
*H04L 9/06*    (2006.01)
(52) U.S. Cl.
CPC .......... *H04L 9/3268* (2013.01); *H04L 9/0618* (2013.01); *H04L 9/3213* (2013.01); *H04L 9/3226* (2013.01)

(58) Field of Classification Search
CPC ... H04L 9/3268; H04L 9/0618; H04L 9/3213; H04L 9/3226; H04L 9/0822; H04L 9/083;
(Continued)

(56) References Cited

U.S. PATENT DOCUMENTS 9,647,845 B2 *   5/2017   Yao .................... H04L 9/0836
9,806,889 B2 *  10/2017   Yao .................... H04L 9/3265
(Continued)

FOREIGN PATENT DOCUMENTS

CN    103220270 A    7/2013
CN    103220271 A    7/2013
(Continued)

OTHER PUBLICATIONS

International Search Report issued on Jan. 6, 2020 in corresponding International application No. PCT/CN2019/109896; 4 pages.

*Primary Examiner* — J. Brant Murphy
(74) *Attorney, Agent, or Firm* — Maier & Maier, PLLC (57) ABSTRACT

The present application provides methods for downloading a key, a client, a password device, and a terminal device, in which, the client sends a request for downloading an initial key to a backend server, and receives a server identity certificate delivered by the backend server and forwards the server identity certificate to the password device. The client acquires a device identity ciphertext returned by the password device and sends the device identity ciphertext to the backend server. The client acquires a server identity ciphertext and an initial key ciphertext generated by the backend server, and sends the server identity ciphertext to the password device. After the password device successfully verifies an identity of the backend server, the client sends the initial key ciphertext to the password device.

18 Claims, 6 Drawing Sheets

(58) Field of Classification Search
CPC ... H04L 9/3263; H04L 9/3273; H04L 63/062; H04L 63/0823; H04L 63/0869
See application file for complete search history.

(56) References Cited

U.S. PATENT DOCUMENTS

| | | | |
|---|---|---|---|
| 9,887,975 B1* | 2/2018 | Gifford | H04W 12/0431 |
| 9,948,624 B2* | 4/2018 | Su | H04L 9/0836 |
| 2004/0003247 A1* | 1/2004 | Fraser | H04L 67/104 |
| | | | 713/169 |
| 2007/0288992 A1* | 12/2007 | Robinson | H04L 9/3226 |
| | | | 726/2 |
| 2016/0028547 A1* | 1/2016 | Yao | H04L 63/0807 |
| | | | 713/176 |
| 2016/0028548 A1* | 1/2016 | Yao | H04L 9/3247 |
| | | | 713/176 |
| 2016/0036793 A1* | 2/2016 | Su | H04L 63/062 |
| | | | 713/171 |
| 2019/0394053 A1* | 12/2019 | Yu | G06F 21/33 |
| 2020/0089488 A1* | 3/2020 | Yu | G06F 16/148 |

FOREIGN PATENT DOCUMENTS

| | | | | |
|---|---|---|---|---|
| CN | 103237004 A | | 8/2013 | |
| CN | 103237005 A | | 8/2013 | |
| CN | 103701609 A | * | 4/2014 | ...... H04L 9/0825 |
| CN | 106712939 A | | 5/2017 | |
| CN | 107888379 A | | 4/2018 | |

\* cited by examiner

METHOD FOR DOWNLOADING KEY, CLIENT, PASSWORD DEVICE, AND TERMINAL DEVICE

TECHNICAL FIELD

The present application relates to the technical field of information security, and more particularly to a method for downloading a key, a client, a password device, and a terminal device.

BACKGROUND

Point of sale (POS) device is required to be injected with the initial key before being placed into the merchant environment, and the initial key will be used in subsequent operations, such as, key downloading and device security initialization.

Based on the security of the key and the device, the downloading operation of the initial key usually requires to be carried out in the safety house. The current implementation method is as follows: after the device is assembled in the production line, the device is conveyed to the safety house for downloading the initial key, during which, an operator firstly passes through a double key or password authentication, and then takes the device into the safety house to download the initial key.

Therefore, the existing technology has the problem of being restricted by the operation site and thus requires more labor costs.

SUMMARY

In view of this, it is an objective of embodiments of the present application to provide a method for downloading a key, a client, a password device, and a terminal device, which aim at solving the technical problem in the existing technology that the operation site is restricted, resulting in high labor cost.

A first aspect of embodiments of the present application provides a method for downloading a key. The method is applied to a client and comprises:

performing bidirectional verification with a backend server via a security device connected by a user;

querying device information of a password device after the bidirectional verification is passed, uploading the device information to the backend server, and sending a request for downloading an initial key to the backend server;

receiving a server identity certificate delivered by the backend server based on the request for downloading the initial key, and forwarding the server identity certificate to the password device;

acquiring a device identity ciphertext returned by the password device, and forwarding the device identity ciphertext to the backend server, in which, the device identity ciphertext is generated by the password device after the server identity certificate is successfully verified by the password device;

acquiring a server identity ciphertext generated by the backend server based on the device identity ciphertext, and an initial key ciphertext generated by encrypting the initial key by the backend server, and sending the server identity ciphertext to the password device; in which, the server identity ciphertext is configured for instructing the password device to verify an identity of the backend server; and delivering the initial key ciphertext to the password device, after the identity of the backend server is successfully verified by the password device based on the server identity ciphertext.

A second aspect of the present application provides a client, comprising:

a bidirectional verification module, configured for performing bidirectional verification with a backend server via a security device connected by a user;

a key request module, configured for querying device information of a password device after the bidirectional verification is passed, uploading the device information to the backend server, and sending a request for downloading an initial key to the backend server;

a server certificate delivery module, configured for receiving a server identity certificate delivered by the backend server based on the request for downloading the initial key, and forwarding the server identity certificate to the password device;

a device ciphertext delivery module, configured for acquiring a device identity ciphertext returned by the password device, and forwarding the device identity ciphertext to the backend server, in which, the device identity ciphertext is generated by the password device after the server identity certificate is successfully verified by the password device;

a server ciphertext delivery module, configured for acquiring a server identity ciphertext generated by the backend server based on the device identity ciphertext, and an initial key ciphertext generated by encrypting the initial key by the backend server, and sending the server identity ciphertext to the password device; in which, the server identity ciphertext is configured for instructing the password device to verify an identity of the backend server; and an initial key delivery module, configured for delivering the initial key ciphertext to the password device, after the identity of the backend server is successfully verified by the password device based on the server identity ciphertext.

A third aspect of embodiments of the present application provides a method for downloading a key. The method is applied to a password device and comprises the following steps:

uploading, through a client, device information of the password device and a request for downloading an initial key to a backend server;

receiving, through the client, a server identity certificate delivered by the backend server based on the request for downloading the initial key;

verifying the server identity certificate, generating a device identity ciphertext after the verification of the sever identity certificate is passed, and sending the device identity ciphertext to the backend server through the client;

receiving, through the client, a server identity ciphertext generated by the backend server using the device identity ciphertext; and acquiring, through the client, an initial key ciphertext generated by the backend server, after an identity of the backend server is successfully verified based on the server identity ciphertext, and decrypting the initial key ciphertext to obtain the initial key.

A fourth aspect of embodiments of the present application provides a password device. The password device comprises:

a key downloading request module, configured for uploading, through a client, device information of the password device and a request for downloading an initial key to a backend server;

a server certificate acquisition module, configured for receiving, through the client, a server identity certificate delivered by the backend server based on the request for downloading the initial key;

a device ciphertext generation module, configured for verifying the server identity certificate, generating a device identity ciphertext after the verification of the sever identity certificate is passed, and sending the device identity ciphertext to the backend server through the client;

a server ciphertext acquisition module, configured for receiving, through the client, a server identity ciphertext generated by the backend server using the device identity ciphertext; and an initial key acquisition module, configured for acquiring, through the client, an initial key ciphertext generated by the backend server, after an identity of the backend server is successfully verified based on the server identity ciphertext, and decrypting the initial key ciphertext to obtain the initial key.

A fifth aspect of embodiments of the present application provides a terminal device. The terminal device comprises: a memory, a processor, and a computer program stored in the memory and executable on the processor. The processor is configured to implement steps of the method for downloading a key according to the above first aspect or steps of the method for downloading a key according to the above third aspect, when executing the computer program.

A sixth aspect of embodiments of the present application provides a non-transitory computer readable storage medium, storing a computer program, which, when being executed by the processor, causes the processor to implement steps of the method for downloading a key according to the above first aspect or steps of the method for downloading a key according to the above third aspect.

Compared with the existing technology, embodiments of the present application have the following beneficial effects: the password device, the client, and the backend server achieve mutual identity verification through encrypted verification method, and after the identity verification is passed, the initial key is delivered from the backend server to the password device. In this way, the initial key can be safely downloaded to the password device in the production environment, and the downloading of the initial key can be safely completed without requiring the password device to be conveyed into the safety house, which has no restriction requirement on the operation location, reduces the personnel management costs, and improves the security and timeliness of key downloads.

BRIEF DESCRIPTION OF THE DRAWINGS

In order to more clearly illustrate the technical solutions in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

DETAILED DESCRIPTION OF THE EMBODIMENTS

In the following description, for the purpose of illustration rather than limitation, specific details such as specific system structures and technologies are set forth in order to provide a thorough understanding of the embodiments of the present application. However, it will be apparent to those skilled in the art that the present application may be practiced in other embodiments without these specific details. In other instances, detailed descriptions of well-known systems, devices, circuits, and methods are omitted so as not to obscure the description of the present application with unnecessary detail.

The term "including" and any other variations in the description, claims, and the above drawings of the present application means "including but not limited to", and is intended to cover non-exclusive inclusion. For example, a process, method or system, product or device comprising a series of steps or units is not limited to the listed steps or units, but optionally also includes unlisted steps or units, or optionally also includes other steps or units inherent in this process, method, product, or device. Also, the terms "first", "second", and "third", and the like are used to distinguish different objects, rather than to describe a particular order.

In order to illustrate the technical solutions of the present application, the following specific embodiments are used for description.

Figure 1:
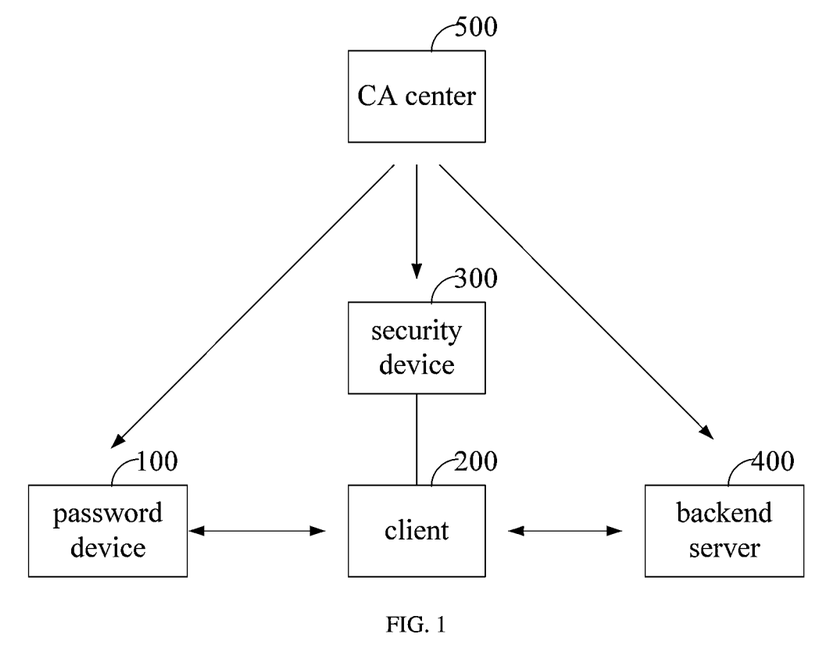
FIG. 1 is a schematic structure diagram of a system for downloading a key provided by an embodiment of the present application.

As shown in FIG. 1, the technical solution is realized based on a system for downloading a key. The system for downloading a key comprises: a password device 100, a client 200, a security device 300, and a backend server 400. Furthermore, the system is realized further based on a certificate authority (CA) center 500. The connection relationship and the information interaction relationship among different devices are as follows:

The backend server 400 is arranged in a safety house, is configured to store the initial key and to implement the key management, processing of request for downloading the key, and storage and management of the device information of the password device 100. Two pairs of digital certificates and private keys are pre-stored in the backend server 400 and are respectively as follows: a server identity certificate and a corresponding private key, and server transport layer security (TLS) certificate and a corresponding private key. The server identity certificate and the corresponding private key are configured to enable the password device 100 to verify the identity of the backend server 400 and to agree on the transmission key. The server TLS certificate and the corresponding private key are configured to enable the client 200 to perform bidirectional verification between the security device 300 and the backend server 400 and to establish a security channel therebetween.

The client 200 is a program having a human-computer interaction interface and running on a terminal device such as a PC, and corresponds to the backend server 400. The user performs operations such as key download through the client terminal 200, so as to download the initial key stored in the backend server 400 to the password device 100. The client 200 communicates with the backend server 400 through remote network communication, such as a local area network, the Internet, and the like. The client 200 communicates with the password device 100 through short-range point-to-point communication. The client 200 and the password device 100 are connected via wired or wireless communication lines, such as USB, serial port, Bluetooth and other communication lines. The client 200 acts as an intermediate node to realize data transmission between the backend server 400 and the password device 100.

The security device 300, which may be a security tool such as a USB shield, is used to access the client 200 to implement user login, and a pair of user identity certificate and a corresponding private key are pre-stored in the security device 300.

The password device 100 may be a sales terminal device, such as a POS device, or may be other types of terminal devices that need to provide password services such as encryption and/or updating information.

The CA center 500, which is a third-party trusted organization, is used to authenticate the public key and generate a digital certificate. The server identity certificate, the server TLS certificate, and the user identity certificate are all issued by the same CA center 500. The password device 100, the security device 300, and the backend server 400 all store the same CA public key.

Example 1

Figure 2:
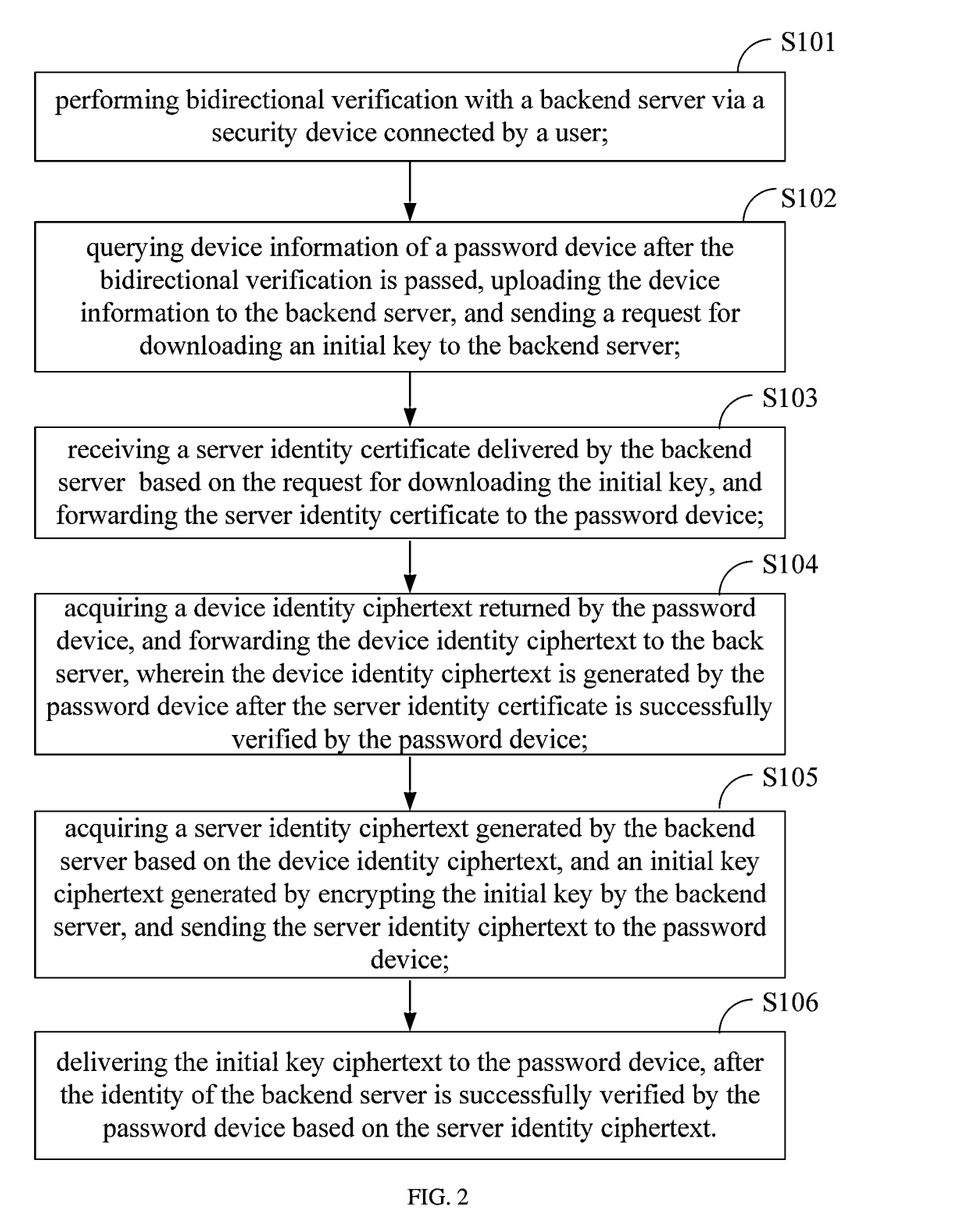
FIG. 2 is a schematic flowchart of a method for downloading a key provided by an embodiment of the present application.

FIG. 2 shows an implementation process of a method for downloading a key provided by Example 1 of the present application. The process execution body of this embodiment may be a client, and the process is described in detail as follows:

In step S101, bidirectional verification is performed with a backend server via a security device connected by a user.

In step S102, after the bidirectional verification is passed, device information of a password device is queried, the device information is uploaded to the backend server, and a request for downloading an initial key is sent to the backend server.

In this embodiment, the client uploads the device information to the backend server, so as to enable the backend server to realize the management of different password devices.

The device information can include the device serial number and is used by the backend server to distinguish different password devices and to record the encryption process and encryption result of each password device, respectively.

The request for downloading the initial key is used by the client to request the backend server to send the initial key to the corresponding password device and to instruct the password device to download the initial key.

In this embodiment, the client queries the device information of the password device and uploads the device information to the backend server. After the client obtains the device information, the client sends the request for downloading the initial key to the backend server, to request the backend server to download the initial key to the password device.

In step S103, a server identity certificate delivered by the backend server based on the request for downloading the initial key is received, and the server identity certificate is forwarded to the password device.

In this embodiment, after receiving the request for downloading the initial key in step S102, the backend server sends the server identity certificate to the client, and the client forwards the server identity certificate to the password device, so that the password device verifies the server identity certificate.

In step S104, a device identity ciphertext returned by the password device is acquired, and the device identity ciphertext is forwarded to the backend server, in which, the device identity ciphertext is generated by the password device after the server identity certificate is successfully verified by the password device.

In this embodiment, the password device verifies the server identity certificate in step S103, and after the certificate verification is passed, the password device generates the device identity ciphertext, and the client forwards the device identity ciphertext to the backend server.

In an embodiment, in step S104, the process of verifying the server identity certificate by the password device includes: using, by the password device, a locally pre-stored CA public key to verify a digital signature in the server identity certificate sent by the backend server; and determining that verification of the server identity certification is passed, when the verification is successful; or stopping executing subsequent steps and informing the client that the verification of the server identity certification is failed, when the verification is failed.

Optionally, in another embodiment, in step S103, the backend server also delivers a revocation list, and the password device receives the revocation list through the client. In step S104, the password device verifies the server identity certificate and checks whether the certificate is listed in the revocation list. If the verification of the server identity certificate fails or the certificate has been revoked, the subsequent steps are terminated.

In step S105, it is acquired a server identity ciphertext generated by the backend server based on the device identity ciphertext, and an initial key ciphertext generated by encrypting the initial key by the backend server, and the server identity ciphertext is sent to the password device; in which, the server identity ciphertext is configured for instructing the password device to verify an identity of the backend server.

In this embodiment, the backend server generates the server identity ciphertext after receiving the device identity ciphertext forwarded by the client in step S104. The client acquires the server identity ciphertext and forwards the server identity ciphertext to the password device.

In step S106, after the identity of the backend server is successfully verified by the password device based on the server identity ciphertext, the initial key ciphertext is delivered to the password device.

In this embodiment, the initial key is used for the password device to perform a password service.

In an embodiment, after verifying that the backend server is credible, the password device obtains the initial key ciphertext from the client, thereby obtaining the initial key, and returns to the client the result that the key is successfully downloaded. If the password device fails to verify the backend server, the password device terminates requesting the client for the initial key, and returns to the client the result of verification failure.

In the embodiment of the present application, the initial key can be safely downloaded to the password device in a production environment (for example, a production line in a factory building), and the password device can safely complete the download of the initial key without entering the safety house. The requirement of downloading the initial key in an environment other than the safety house is realized, the personnel management cost is reduced, and the security and timeliness of the key download is improved.

In an embodiment of the present application, step S101 specifically comprises:

step a, performing the bidirectional verification with the backend server via the security device connected by the user by an SSL/TLS bidirectional verification rule; in which, a user identity certificate and a corresponding private key are stored in the security device; and step b, logging into the backend server by using the security device after the bi-directional verification is passed.

In this embodiment, the security device is adopted. The security device has built-in user identity certificate and digital signature. The client uses the security device to access the backend server for user identity verification. After the verification is passed, the user operates the security channel established between the client and the backend server for transferring the key. In this way, the user identity is verified via this dual control method, thereby ensuring the legitimacy of the password device.

This embodiment realizes the establishment of a secure connection between the client and the backend server, verifies the identity of the user, and only allows the operation of personnel who meet the security authority, thereby improving the security.

In an embodiment, step a includes:

1) sending a user login request to the backend server after being connected to the security device;
2) receiving the server TLS certificate and digital signature returned by the backend server according to the user login request;
3) verifying legitimacy of the server TLS certificate and the digital signature; using a public key in the server TLS certificate to encrypt a random number to generate a first handshake ciphertext, after the legitimacy of the serer TLS certificate and the digital signature is verified, calculating a digest of the first handshake ciphertext, and forwarding the first handshake ciphertext and the digest thereof to the backend server;
4) receiving a second handshake ciphertext returned by the backend server, after the backend server verifies and confirms that the first handshake ciphertext is credible; and
5) verifying whether the second handshake ciphertext is credible; confirming that the backend server and the user are both legal objects, if the second handshake ciphertext is credible; and determining that the user successfully logs in to the background service.

In an embodiment, the process of verifying, by the backend server, whether the first handshake ciphertext is credible includes:

decrypting, by the backend server, the first handshake ciphertext using a private key of the backend server, to obtain first handshake information; calculating a digest of the first handshake information and comparing the digest of the first handshake information with a digest received from the client; and determining that the first handshake ciphertext is credible if the two digests are consistent.

In an embodiment of the present application, in step S104, the device identity ciphertext is a ciphertext generated by encrypting a temporary transfer key and an identity authentication token by the password device by a public key in the server identity certificate after the server identity certificate is successfully verified by the password device;

in which, both the temporary transfer key and the identity authentication token are randomly generated by the password device; and the device identity ciphertext is configured for enabling the backend server to generate the server identity ciphertext by using the device identity ciphertext, to enable the password device to verify the identity of the backend server.

In this embodiment, after the password device passes the verification of the server identity certificate, the password device randomly generates the temporary transfer key and the identity authentication token, and the password device uses the public key in the server identity certificate to encrypt the temporary transfer key and the identity authentication token, so as to generate the device identity ciphertext. The device identity ciphertext is then uploaded to the backend server through the client.

Optionally, in another embodiment, the password device randomly generates a public-private key pair, which includes the public key and private key of the password device, and the public-private key pair is then uploaded to the backend server through the client.

In an embodiment of the present application, in step S105, the server identity ciphertext is a ciphertext generated by decrypting the device identity ciphertext by the backend server by a corresponding private key to obtain a device key and device identity information and encrypting the device identity information by using the device key.

In this embodiment, the backend server decrypts the device identity ciphertext using the server private key, obtains the device key and the device identity information, and encrypts the device identity information by using the device key to generate the server identity ciphertext.

Based on the above, the password device encrypts the temporary transfer key and the identity authentication token to generate the device identity ciphertext.

The backend server decrypts the device identity ciphertext to obtain the device key and the device identity information.

If both the backend server and the password device are credible objects, the device key should be consistent with the temporary transfer key, and the device identity information should be consistent with the identity authentication token.

In an embodiment of the present application, in step S105, the server identity ciphertext is configured to be decrypted by the password device to obtain a plaintext, such that the password device compares pre-stored identity authentication token with the plaintext, and determines that the identity of the backend server is successfully verified if the pre-stored identity authentication token is verified to be consistent with the plaintext.

Based on the above analysis, the password device decrypts the server identity ciphertext to obtain the plaintext. If both the backend server and the password device are credible, the plaintext should include the identity authentication token.

In this embodiment, the password device compares the pre-stored identity authentication token with the plaintext, and determines that the identity verification of the backend server is successful after it is verified that the pre-stored identity authentication token is consistent with the plaintext. Once the verification is successful, it is determined that the backend server is credible. In this way, the identity authentication of the backend server is completed by the password device.

In an embodiment of the present application, in step S105, the initial key ciphertext is generated by encrypting a pre-stored initial key by the backend server using the device key or a public key of the password device; and The initial key ciphertext is configured to be decrypted by the password device to obtain the initial key.

In this embodiment, the public key of the password device is the public key generated by the password device.

When the backend server uses the device key to encrypt the initial key to generate the initial key ciphertext, the password device uses the temporary transfer key to decrypt the initial key ciphertext to obtain the initial key.

When the backend server encrypts the initial key with the public key of the password device to generate the initial key ciphertext, the password device uses the public key thereof to decrypt the initial key ciphertext to obtain the initial key.

In this embodiment, the backend server generates and sends the encrypted initial key ciphertext to the client, and the client sends the initial key ciphertext to the password device. The password device decrypts the initial key ciphertext to obtain the initial key. The password device writes the initial key to a key storage area, thus completing the downloading of the initial key.

In the embodiment of the present application, the downloading process of the initial key by the password device is simplified, and the downloading process can be performed outside the safety house, which reduces the expenses of related procedures, such as transportation, packaging, and unpacking of the password device. Moreover, the operation of downloading the initial key of the password device can be performed in the production line, which can improve production efficiency, and further, enables the sites of the safety house to be free from being restricted to the production area or the storage area of the password device, making the sites of the safety house more flexibly arranged.

Example 2

Figure 3:
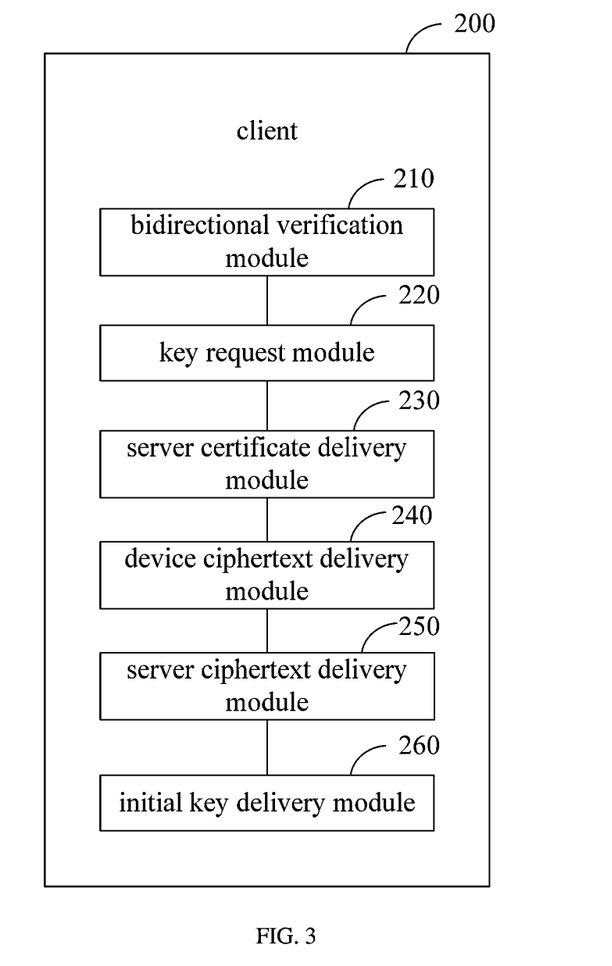
FIG. 3 is a schematic structure diagram of a client provided by an embodiment of the present application.

As shown in FIG. 3, a client 200 provided by Example 2 of the present application is configured for implementing the method steps of an embodiment corresponding to FIG. 2, and comprises:
a bidirectional verification module 210, configured for performing bidirectional verification with a backend server via a security device connected by a user;
a key request module 220, configured for querying device information of a password device after the bidirectional verification is passed, uploading the device information to the backend server, and sending a request for downloading an initial key to the backend server;
a server certificate delivery module 230, configured for receiving a server identity certificate delivered by the backend server based on the request for downloading the initial key, and forwarding the server identity certificate to the password device;
a device ciphertext delivery module 240, configured for acquiring a device identity ciphertext returned by the password device, and forwarding the device identity ciphertext to the backend server, in which, the device identity ciphertext is generated by the password device after the server identity certificate is successfully verified by the password device;
a server ciphertext delivery module 250, configured for acquiring a server identity ciphertext generated by the backend server based on the device identity ciphertext, and an initial key ciphertext generated by encrypting the initial key by the backend server, and sending the server identity ciphertext to the password device; in which, the server identity ciphertext is configured for instructing the password device to verify an identity of the backend server; and
an initial key delivery module 260, configured for delivering the initial key ciphertext to the password device, after the identity of the backend server is successfully verified by the password device based on the server identity ciphertext.

In an embodiment of the present application, the bidirectional verification module 210 comprises:
a user verification module, configured for performing the bidirectional verification with the backend server via the security device connected by the user by an SSL/TLS bidirectional verification rule; in which, a user identity certificate and a corresponding private key are stored in the security device; and
a login module, configured for logging into the backend server by using the security device after the bi-directional verification is passed.

In an embodiment, the client 200 further comprises other functional modules/units, which are used to implement the method steps of various embodiments in Example 1.

Example 3

Figure 4:
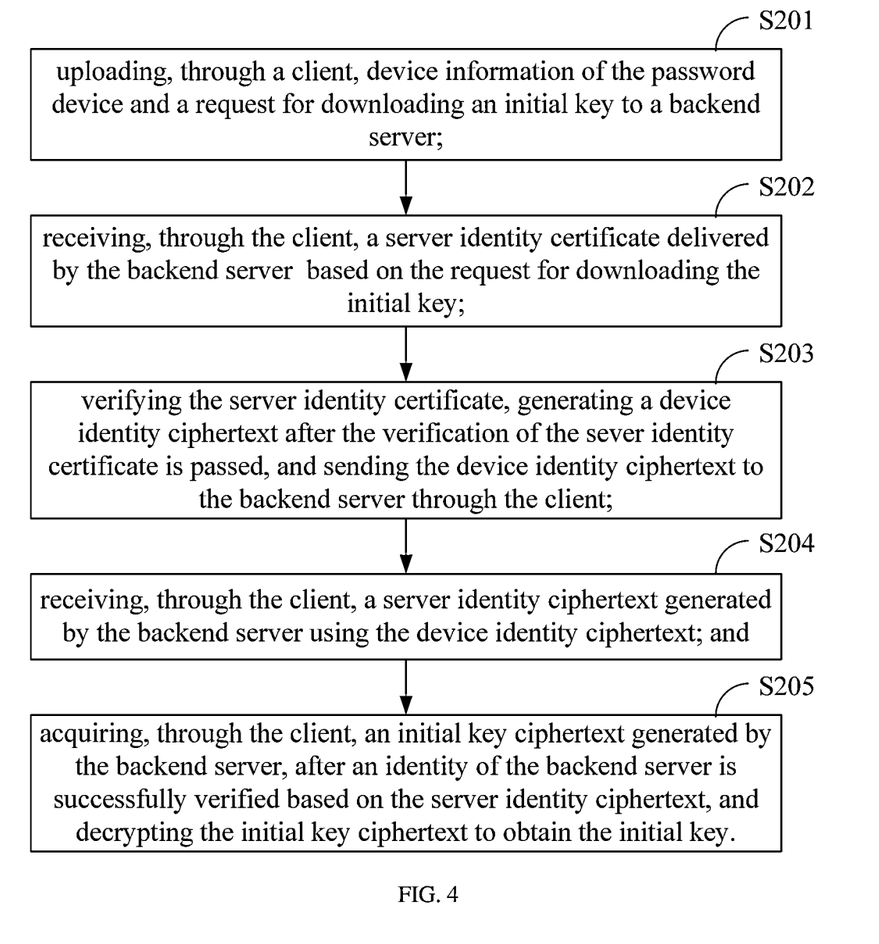
FIG. 4 is a schematic flowchart of a method for downloading a key provided by another embodiment of the present application.

FIG. 4 is an implementation flow of a method for downloading a key provided by Example 3. The execution body of the flow provided by this embodiment may be a password device and comprises the following steps:
step S201, uploading, through a client, device information of the password device and a request for downloading an initial key to a backend server;
step S202, receiving, through the client, a server identity certificate delivered by the backend server based on the request for downloading the initial key;
step S203, verifying the server identity certificate, generating a device identity ciphertext after the verification of the sever identity certificate is passed, and sending the device identity ciphertext to the backend server through the client;
step S204, receiving, through the client, a server identity ciphertext generated by the backend server using the device identity ciphertext; and
step S205, acquiring, through the client, an initial key ciphertext generated by the backend server, after an identity of the backend server is successfully verified based on the server identity ciphertext, and decrypting the initial key ciphertext to obtain the initial key.

Example 4

Figure 5:
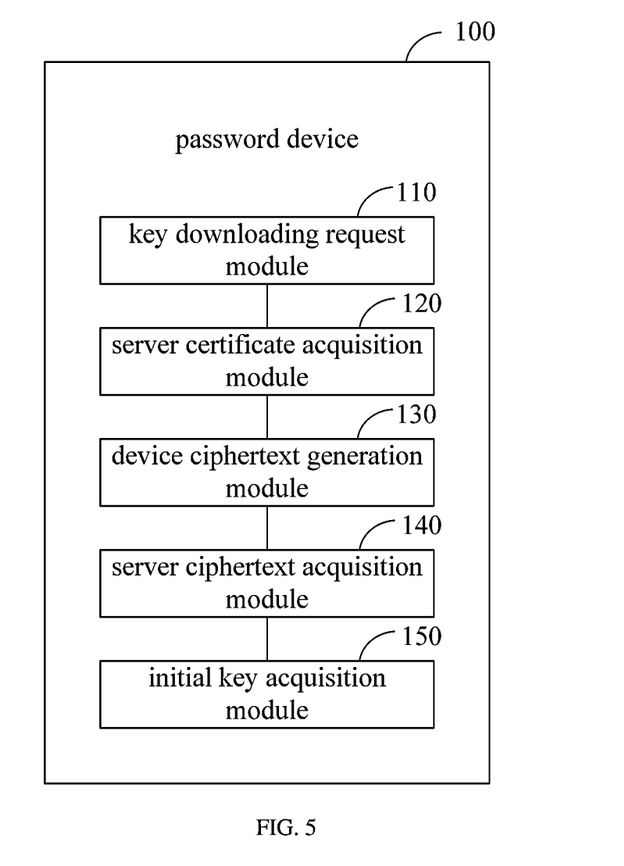
FIG. 5 is a schematic structure diagram of a password device provided by an embodiment of the present application.

As shown in FIG. 5, a password device 100 provided by Example 4 of the present application is configured for implementing the method steps of an embodiment corresponding to FIG. 4 and comprises:
a key downloading request module 110, configured for uploading, through a client, device information of the password device and a request for downloading an initial key to a backend server;
a server certificate acquisition module 120, configured for receiving, through the client, a server identity certificate delivered by the backend server based on the request for downloading the initial key;

a device ciphertext generation module 130, configured for verifying the server identity certificate, generating a device identity ciphertext after the verification of the sever identity certificate is passed, and sending the device identity ciphertext to the backend server through the client;

a server ciphertext acquisition module 140, configured for receiving, through the client, a server identity ciphertext generated by the backend server using the device identity ciphertext; and an initial key acquisition module 150, configured for acquiring, through the client, an initial key ciphertext generated by the backend server, after an identity of the backend server is successfully verified based on the server identity ciphertext, and decrypting the initial key ciphertext to obtain the initial key.

In an embodiment, the password device 100 further comprises other functional modules/units, so as to implement method steps of various embodiments of Example 1.

Example 5

Figure 6:
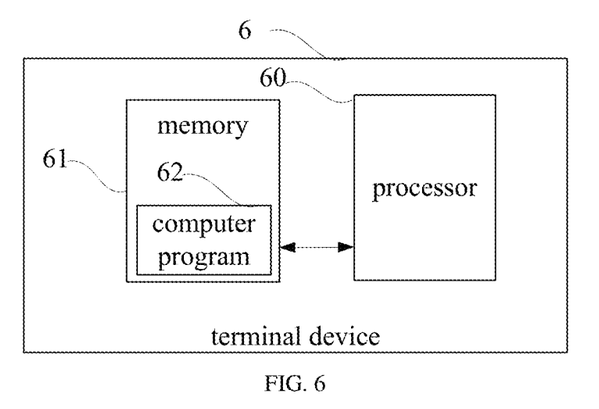
FIG. 6 is a schematic diagram of a terminal device provided by an embodiment of the present application.

FIG. 6 is a schematic diagram of a terminal device provided by an embodiment of the present application. As shown in FIG. 6, the terminal device 6 of this embodiment comprises: a memory 60, a processor 61, and a computer program 62 stored in the memory 60 and executable on the processor 61. The processor 61 is configured to implement steps of various embodiments of Example 1, for example, steps S101-S105 as shown in FIG. 2, when executing the computer program 62. Or alternatively, the processor 61 is configured to implement steps of various embodiments of Example 3, for example, steps S201-S205 as shown in FIG. 4.

The terminal device 6 refers to a terminal having data processing capabilities, including but not limited to POS devices, computers, workstations, and even some smart phones, pocket PCs, tablet PCs, personal digital assistants (PDAs), smart TVs, and the like. Terminal devices are generally installed with operating systems, including but not limited to: Windows operating systems, LINUX operating systems, Android operating systems, Symbian operating systems, Windows mobile operating systems, and iOS operating systems. The specific examples of the terminal device 6 are listed above in detail, and those skilled in the art can realize that the terminal device is not limited to the above listed examples.

The terminal device may include, but is not limited to, the processor 60 and the memory 61. Those skilled in the art can understand that FIG. 6 is only an example of the terminal device 6, and does not constitute a limitation on the terminal device 6, and may include more or less components than the one as shown in the figure, or combine some components, or different components. For example, the terminal device 6 may further include an input and output device, a network access device, a bus, and the like.

The so-called processor 60 may be a central processing unit (CPU), and may also be other general-purpose processors, digital signal processors (DSP), application specific integrated circuits (ASIC), field-programmable gate arrays (FPGA) or other programmable logic devices, discrete gate or transistor logic devices, discrete hardware components, and the like. A general-purpose processor may be a microprocessor or any conventional processor or the like.

The memory 61 may be an internal storage unit of the terminal device 6, such as a hard disk or a memory of the terminal device 6. The memory 61 may also be an external storage device of the terminal device 6, such as a plug-in hard disk, a smart media card (SMC), a secure digital (SD) equipped on the terminal device 6 card, Flash Card, and the like. Further, the memory 61 may also include both an internal storage unit of the terminal device 6 and an external storage device. The memory 61 is used to store the computer program and other programs and data required by the terminal device 6. The memory 61 can also be used to temporarily store data that have been output or will be output.

Example 6

Embodiments of the present application further provide a non-transitory computer readable storage medium. The non-transitory computer readable storage medium stores a computer program. The computer program, when being executed by the processor, causes the processor to implement steps of various embodiments of Example 1, for example, steps S101-S105 as shown in FIG. 2. Or alternatively, the computer program, when being executed by the processor, causes the processor to implement steps of various embodiments of Example 3, for example, steps S201-S205 as shown in FIG. 4.

The computer program can be stored in a computer-readable storage medium, and when the computer program is executed by the processor, the steps of the above-mentioned method embodiments can be implemented. The computer program includes computer program code, and the computer program code may be in the form of a source code, an object code, an executable file or some intermediate forms, and the like. The computer-readable medium may include: any entity or device capable of carrying the computer program code, such as, a recording medium, a U disk, a removable hard disk, a magnetic disk, an optical disk, a computer memory, a read-only memory (ROM), a random access memory (RAM), an electric carrier signal, a telecommunication signal, a software distribution medium, and the like.

It should be understood that the sequence numbers of the steps in the above embodiments do not mean the sequence of execution, and the execution sequence of each process should be determined by its functions and internal logic, and should not constitute any limitation to the implementation process of the embodiments of the present application.

It should be understood that, for the convenience and simplicity of description, only the division of the above functional modules is used as an example for illustration. In practical applications, the above functions may be allocated to different functional modules as required. That is, the internal structure of the client 200 or the password device 100 is divided into different functional modules to complete all or part of the functions described above. Each functional module in the embodiment may be integrated in one processing unit, or each unit may exist physically alone, or two or more units may be integrated in one unit, and the above-mentioned integrated modules may be implemented in the form of hardware, as well as in the form of software functional units. In addition, the specific names of the functional modules are only for the convenience of distinguishing from each other, and are not used to limit the protection scope of the present application. For the specific working process of the modules in the client 200 or the password device 100, reference may be made to the corresponding process in the foregoing method embodiments, thus the details will not repeated herein.

It should be understood that, in the above embodiments, the description of each embodiment has its own emphasis. Embodiments of Examples 1 to 4 can be combined arbitrarily, and new embodiments formed after the combination are also within the protection scope of the present application. For parts that are not described or described in detail in a certain embodiment, reference may be made to related descriptions of other embodiments.

Those ordinary skills in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Those skilled in the art may implement the described functionality using different methods for each particular application, but such implementations should not be considered beyond the scope of the present application.

In the embodiments provided by the present application, it should be understood that the disclosed terminal device and method may be implemented in other manners. For example, the system/terminal device embodiments described above are merely illustrative. For example, the division of the modules or units is only a logical function division. In actual implementation, other division methods may be adopted. For example, multiple units or components may be combined or integrated into another system, or some features may be ignored, or not be executed. On the other hand, the shown or discussed mutual coupling or direct coupling or communication connection may be indirect coupling or communication connection through some interfaces, devices, or units, and may be in electrical, mechanical, or other forms.

The above-mentioned embodiments are only used to illustrate, but not to limit, the technical solutions of the present application. Although the present application has been described in detail with reference to the foregoing embodiments, those ordinary skills in the art should understand that: it is still possible to modify the technical solutions recorded in the foregoing embodiments, or perform equivalent replacements to some of the technical features. However, these modifications or replacements do not make the essence of the corresponding technical solutions deviate from the spirit and scope of the technical solutions of the embodiments of the present application, and should be included within the protection scope of the present application.

What is claimed is:

1. A method for downloading a key, the method being applied to a client and the method comprising the following steps:
    performing bidirectional verification with a backend server via a security device connected by a user;
    querying device information of a password device after the bidirectional verification is passed, uploading the device information to the backend server, and sending a request for
    downloading an initial key to the backend server;
    receiving a server identity certificate delivered by the backend server based on the request for downloading the initial key, and forwarding the server identity certificate to the password device;
    acquiring a device identity ciphertext returned by the password device, and forwarding the device identity ciphertext to the backend server, wherein the device identity ciphertext is generated by the password device after the server identity certificate is successfully verified by the password device;
    acquiring a server identity ciphertext generated by the backend server based on the device identity ciphertext, and an initial key ciphertext generated by encrypting the initial key by the backend server, and sending the server identity ciphertext to the password device; wherein the server identity ciphertext is configured for instructing the password device to verify an identity of the backend server; and
    delivering the initial key ciphertext to the password device, after the identity of the backend server is successfully verified by the password device based on the server identity ciphertext.

2. The method for downloading a key according to claim 1, wherein
    the device identity ciphertext is a ciphertext generated by encrypting a temporary transfer key and an identity authentication token by the password device by a public key in the server identity certificate after the server identity certificate is successfully verified by the password device;
    both the temporary transfer key and the identity authentication token are randomly generated by the password device; and
    the device identity ciphertext is configured for enabling the backend server to generate the server identity ciphertext by using the device identity ciphertext, to enable the password device to verify the identity of the backend server.

3. The method for downloading a key according to claim 2, wherein the step of performing the bidirectional verification with the backend server via the security device connected by the user comprises:
    performing the bidirectional verification with the backend server via the security device connected by the user by an SSL/TLS bidirectional verification rule; wherein a user identity certificate and a corresponding private key are stored in the security device; and
    logging into the backend server by using the security device after the bi-directional verification is passed.

4. The method for downloading a key according to claim 1, wherein
    the server identity ciphertext is a ciphertext generated by decrypting the device identity ciphertext by the backend server by a corresponding private key to obtain a device key and device identity information and encrypting the device identity information by using the device key; and
    the server identity ciphertext is configured to be decrypted by the password device to obtain a plaintext, such that the password device compares pre-stored identity authentication token with the plaintext, and determines that the identity of the backend server is successfully verified if the pre-stored identity authentication token is verified to be consistent with the plaintext.

5. The method for downloading a key according to claim 4, wherein
    the initial key ciphertext is generated by encrypting a pre-stored initial key by the backend server using the device key or a public key of the password device; and
    the initial key ciphertext is configured to be decrypted by the password device to obtain the initial key.

6. The method for downloading a key according to claim 5, wherein the step of performing the bidirectional verification with the backend server via the security device connected by the user comprises:

performing the bidirectional verification with the backend server via the security device connected by the user by an SSL/TLS bidirectional verification rule; wherein a user identity certificate and a corresponding private key are stored in the security device; and logging into the backend server by using the security device after the bi-directional verification is passed.

7. The method for downloading a key according to claim 4, wherein the step of performing the bidirectional verification with the backend server via the security device connected by the user comprises:

performing the bidirectional verification with the backend server via the security device connected by the user by an SSL/TLS bidirectional verification rule; wherein a user identity certificate and a corresponding private key are stored in the security device; and logging into the backend server by using the security device after the bi-directional verification is passed.

8. The method for downloading a key according to claim 1, wherein the step of performing the bidirectional verification with the backend server via the security device connected by the user comprises:

performing the bidirectional verification with the backend server via the security device connected by the user by an SSL/TLS bidirectional verification rule; wherein a user identity certificate and a corresponding private key are stored in the security device; and logging into the backend server by using the security device after the bi-directional verification is passed.

9. A terminal device, comprising: a memory, a processor, and a computer program stored in the memory and executable on the processor, wherein the processor is configured to implement a method for downloading a key when executing the computer program; wherein the method comprises:

performing bidirectional verification with a backend server via a security device connected by a user;

querying device information of a password device after the bidirectional verification is passed, uploading the device information to the backend server, and sending a request for downloading an initial key to the backend server;

receiving a server identity certificate delivered by the backend server based on the request for downloading the initial key, and forwarding the server identity certificate to the password device;

acquiring a device identity ciphertext returned by the password device, and forwarding the device identity ciphertext to the backend server, wherein the device identity ciphertext is generated by the password device after the server identity certificate is successfully verified by the password device;

acquiring a server identity ciphertext generated by the backend server based on the device identity ciphertext, and an initial key ciphertext generated by encrypting the initial key by the backend server, and sending the server identity ciphertext to the password device; wherein the server identity ciphertext is configured for instructing the password device to verify an identity of the backend server; and delivering the initial key ciphertext to the password device, after the identity of the backend server is successfully verified by the password device based on the server identity ciphertext.

10. The terminal device according to claim 9, wherein the device identity ciphertext is a ciphertext generated by encrypting a temporary transfer key and an identity authentication token by the password device by a public key in the server identity certificate after the server identity certificate is successfully verified by the password device;

both the temporary transfer key and the identity authentication token are randomly generated by the password device; and the device identity ciphertext is configured for enabling the backend server to generate the server identity ciphertext by using the device identity ciphertext, to enable the password device to verify the identity of the backend server.

11. The terminal device according to claim 9, wherein the server identity ciphertext is a ciphertext generated by decrypting the device identity ciphertext by the backend server by a corresponding private key to obtain a device key and device identity information and encrypting the device identity information by using the device key; and the server identity ciphertext is configured to be decrypted by the password device to obtain a plaintext, such that the password device compares pre-stored identity authentication token with the plaintext, and determines that the identity of the backend server is successfully verified if the pre-stored identity authentication token is verified to be consistent with the plaintext.

12. The terminal device according to claim 11, wherein the initial key ciphertext is generated by encrypting a pre-stored initial key by the backend server using the device key or a public key of the password device; and the initial key ciphertext is configured to be decrypted by the password device to obtain the initial key.

13. The terminal device according to claim 9, wherein the step of performing the bidirectional verification with the backend server via the security device connected by the user comprises:

performing the bidirectional verification with the backend server via the security device connected by the user by an SSL/TLS bidirectional verification rule; wherein a user identity certificate and a corresponding private key are stored in the security device; and logging into the backend server by using the security device after the bi-directional verification is passed.

14. A non-transitory computer readable storage medium, storing a computer program, which, when being executed by the processor, causes the processor to implement method for downloading a key; and the method comprising:

performing bidirectional verification with a backend server via a security device connected by a user;

querying device information of a password device after the bidirectional verification is passed, uploading the device information to the backend server, and sending a request for downloading an initial key to the backend server;

receiving a server identity certificate delivered by the backend server based on the request for downloading the initial key, and forwarding the server identity certificate to the password device;

acquiring a device identity ciphertext returned by the password device, and forwarding the device identity ciphertext to the backend server, wherein the device identity ciphertext is generated by the password device after the server identity certificate is successfully verified by the password device;

acquiring a server identity ciphertext generated by the backend server based on the device identity ciphertext, and an initial key ciphertext generated by encrypting the initial key by the backend server, and sending the server identity ciphertext to the password device; wherein the server identity ciphertext is configured for instructing the password device to verify an identity of the backend server; and delivering the initial key ciphertext to the password device, after the identity of the backend server is successfully verified by the password device based on the server identity ciphertext.

15. The non-transitory computer readable storage medium according to claim 14, wherein the device identity ciphertext is a ciphertext generated by encrypting a temporary transfer key and an identity authentication token by the password device by a public key in the server identity certificate after the server identity certificate is successfully verified by the password device;

both the temporary transfer key and the identity authentication token are randomly generated by the password device; and the device identity ciphertext is configured for enabling the backend server to generate the server identity ciphertext by using the device identity ciphertext, to enable the password device to verify the identity of the backend server.

16. The non-transitory computer readable storage medium according to claim 14, wherein the server identity ciphertext is a ciphertext generated by decrypting the device identity ciphertext by the backend server by a corresponding private key to obtain a device key and device identity information and encrypting the device identity information by using the device key; and the server identity ciphertext is configured to be decrypted by the password device to obtain a plaintext, such that the password device compares pre-stored identity authentication token with the plaintext, and determines that the identity of the backend server is successfully verified if the pre-stored identity authentication token is verified to be consistent with the plaintext.

17. The non-transitory computer readable storage medium according to claim 16, wherein the initial key ciphertext is generated by encrypting a pre-stored initial key by the backend server using the device key or a public key of the password device; and the initial key ciphertext is configured to be decrypted by the password device to obtain the initial key.

18. The non-transitory computer readable storage medium according to claim 14, wherein the step of performing the bidirectional verification with the backend server via the security device connected by the user comprises:

performing the bidirectional verification with the backend server via the security device connected by the user by an SSL/TLS bidirectional verification rule; wherein a user identity certificate and a corresponding private key are stored in the security device; and logging into the backend server by using the security device after the bi-directional verification is passed.

* * * * *